Jan. 29, 1963 D. R. HOLCOMB 3,076,133

PARAMETRIC FREQUENCY MULTIPLIER

Filed July 31, 1959

INVENTOR
DON R. HOLCOMB,
BY
Walter J. Adam
ATTORNEY.

United States Patent Office 3,076,133
Patented Jan. 29, 1963

3,076,133
PARAMETRIC FREQUENCY MULTIPLIER
Don R. Holcomb, Los Angeles, Calif., assignor to Hughes Aircraft Company, Culver City, Calif., a corporation of Delaware
Filed July 31, 1959, Ser. No. 830,886
6 Claims. (Cl. 321—69)

Figure 1:
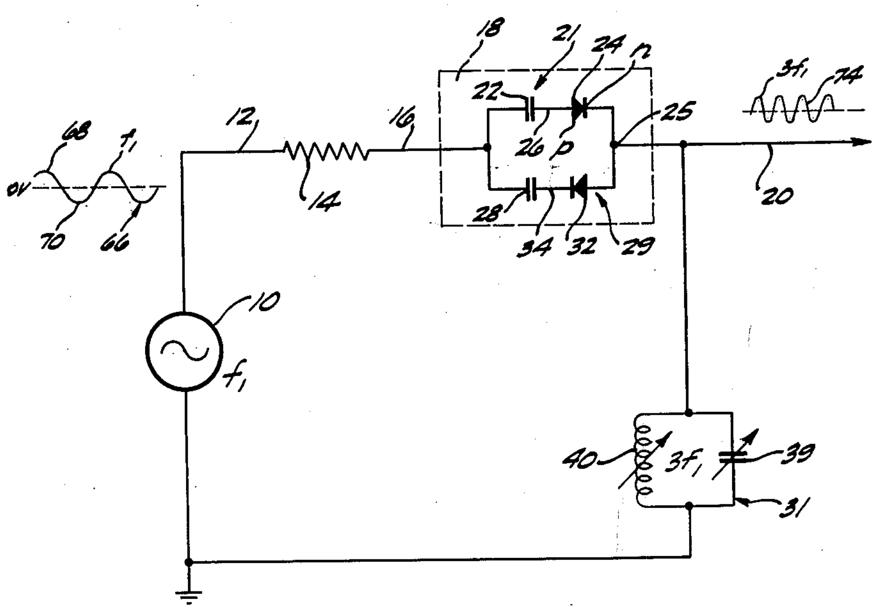

This invention relates to harmonic generators and particularly to an improved parametric frequency multiplier for generating signals at a desired odd harmonic frequency of an input signal.

There are many uses for a simplified circuit which efficiently multiplies the frequency of an input signal. One use for a multiplier is to provide a power source for high frequency signals in a radar transmitter. Klystron devices are presently used to provide transmitted signals at very high radar frequencies. However, klystrons which operate at these very high frequencies are not capable of developing signals at a high power level. Also klystron devices which operate at these high frequencies have a very short life and are extremely expensive to construct compared to klystrons which operate at relatively low frequencies. A simple and reliable frequency multiplier which multiplies the signal from a klystron operating at a relatively low frequency with a high power level to a signal at a high frequency with a high power level would be a great advance in the radar art. Also by utilizing a lower frequency klyston and a frequency multiplier, the klystron for a given transmitted frequency is less expensive and has a longer operating life.

In the prior art, some frequency multipliers or harmonic generators utilize the nonlinear resistance characteristics of conventional diodes driven by a signal generator, which circuits have a low conversion efficiency. Other harmonic generators utilize a single nonlinear capacitance driven by a signal generator to develop desired harmonic frequencies and are found to have disadvantages such as the difficulty of obtaining a filter which has a sufficiently narrow band to provide only a desired harmonic signal. A single nonlinear element develops both even and odd harmonic signals so that a relatively narrow band filter is required. A filter with a sufficiently narrow band is complicated and expensive to build. Other prior art frequency multipliers utilize a multiple stage parametric combination which receives a signal from an oscillator and for each stage includes a nonlinear reactance and a tank circuit. The output of the second stage, for example, is the third harmonic of the pumping signal. This circuit has the disadvantage of a large number of components, and the difficulty of obtaining a filter with a sufficiently narrow band.

A circuit which generates the odd harmonic signals, such as the third harmonic, reliably and with a minimum number of components would be very advantageous to the radar art as well as to other arts. A parametric frequency multiplier which includes a nonlinear capacitance circuit that develops only odd harmonics and then selects a signal at desired odd harmonic frequency is disclosed and claimed in an application, Serial Number 819,727, Parametric Frequency Multiplier, filed June 11, 1959, by Don R. Holcomb and assigned to the same assignee as this application. The circuit in the above named application utilizes a driving source, two diodes connected anode to anode or cathode to cathode in series, having nonlinear characteristics and driven by the driving source, and a tank circuit tuned to present a high impedance to current signals at a desired odd harmonic frequency. Because the series diodes develop current signals at only odd harmonics of the frequency of the driving source, a filter with a relatively wide band may be utilized. The circuits with the diodes connected in series are useful at high frequencies where a relatively small capacitance must be maintained. With radio frequency circuits, practical impedance levels have been found to be between 50 and 300 ohms. Diodes with extremely small capacitance value are difficult to construct without greatly sacrificing efficiency.

However, at lower frequencies a relatively large capacitance value may be utilized. Therefore, a circuit which provides the two capacitances in parallel while still cancelling the even harmonics would be very advantageous to the art. The capacitance of the diodes when added in parallel allows the use of diodes having smaller capacitance values to obtain a combined larger capacitance, thus allowing operation at lower frequencies with diodes which are simpler and physically smaller. Also, for certain applications a larger capacitance value is required than is obtainable from a single diode or from two diodes connected in series.

It is, therefore, an object of this invention to provide a parametric harmonic signal generator whose elements have a minimum of size and complexity;

It is another object of this invention to provide a frequency multiplier which develops a large reactance variation with diodes having a relatively small capacitance.

It is a further object of this invention to provide an improved frequency multiplier to operate at relatively high frequencies and which utilizes a tuned tank circuit and the nonlinear capacitance characteristic of parallel combined diodes to cancel the even harmonics so the tank circuit may be designed with a relatively wide impedance band.

It is a further object of this invention to provide a simplified and highly efficient generator of odd harmonic signals of an input signal utilizing diodes having nonlinear capacitance characteristic for cancelling the even harmonics and with the capacitance of the diodes additive in parallel so as to utilize small capacitance diodes;

Briefly, one form of the frequency multiplier of the present invention includes a variable reactance circuit made up of parallel connected elements, each element including a capacitor connected in series with a diode having a nonlinear capacitance characteristic. The diodes are connected so that the anode to cathode paths are opposite in each element. One end of the reactance circuit is connected to a signal source supplying a signal of a fundamental frequency and the other end is connected to a resonant circuit tuned to a desired odd harmonic of the fundamental frequency. The two parallel diodes provide an over-all capacitance variation of twice the fundamental frequency, which reacts in series with the signal from the source to form current components representing the odd and even harmonic frequencies of the fundamental frequency. The even harmonics developed in the two elements are 180 degrees out of phase from each other and cancel while the odd harmonics are in phase and add together. The resonant circuit presents a high impedance to current signals only at the desired odd harmonic frequency to develop output voltage signals at that frequency. Because the even harmonics are cancelled by the parallel arrangement of the diodes in the reactance circuit, the tank circuit may have a relatively wide impedance band. This circuit combines the capacitance in parallel to allow smaller capacitance diodes to be utilized.

Figure 2:
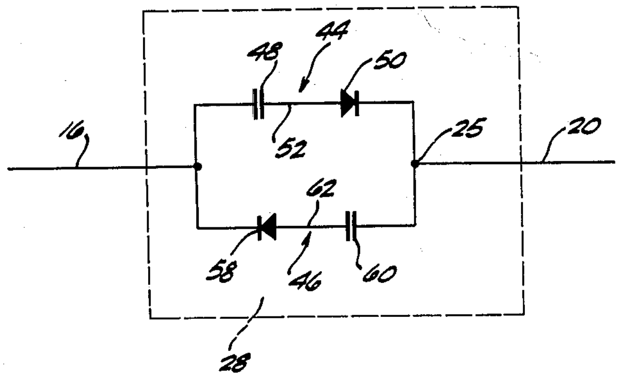

The novel features of this invention, both as to its organization and method of operation, will best be understood from the accompanying description, taken in connection with the accompanying drawing, in which like reference characters refer to like parts, and in which:

FIG. 1 is a schematic circuit diagram of the harmonic generator of this invention; and FIG. 2 is a schematic circuit diagram of an alternate arrangement of the parallel connected diodes and capacitors of FIG. 1.

Referring first to FIG. 1 which shows a circuit diagram of the frequency multiplier of this invention, the circuit connections will be explained. A sine wave generator 10 is provided and is connected so as to be referenced to ground potential, for example. A signal lead 12 is connected from the generator 10 to one end of a resistor 14, which represents the inherent source resistance of the generator 10. The other end of the resistor 14 is connected to one end of a voltage variable reactance circuit 18 by a lead 16. The variable reactance circuit 18 has its other end connected to an output lead 20 upon which a signal of the desired frequency is formed, as will be explained subsequently. The lead 20 is connected to one end of a parallel resonant or tank circuit 31, which includes an inductance 39 and a capacitor 40 connected in parallel. The inductance 39 and capacitor 40 may be of the variable type. The other end of the tank circuit 28 is connected to ground potential, for example. The tank circuit 28 is tuned to an output frequency which is a desired odd harmonic of the frequency $f$ of the generator 10. It is to be noted that the tank circuit 31 may also be a series resonance circuit, as well known in the art. The voltage variable reactance circuit 18 includes first and second reactance elements 21 and 29 connected in parallel. The reactance element 21 includes a capacitor 22 having one plate connected to the lead 16 and includes a diode 24 having an anode coupled to the other plate of the capacitor 22 by a lead 26 and a cathode coupled to a common junction 25 which in turn is connected to the output lead 20. The reactance element 29 includes a capacitor 28 having one plate connected to the lead 16 and includes a diode having a cathode coupled to the other plate of the capacitor 28 through a lead 34 and an anode coupled to the common junction 25. The diodes 24 and 32 are of the type which have nonlinear capacitance characteristics. The capacitors 22 and 28 provide biasing potentials to the diodes for developing a capacitance variation. It is to be noted that the capacitors 22 and 28 may also be connected between the diodes 24 and 32 and the junction 25 with each reactance element operating in a similar manner.

Referring now to FIG. 2, a variable reactance circuit 28 is shown as an alternative arrangement for the double diode reactance circuit 18 of FIG. 1. The variable reactance circuit 28 includes a first reactance element 44 and a second reactance element 46 connected in parallel. The first reactance circuit 44 includes a capacitor 48 having one plate connected to the lead 16 and the other plate connected to the anode of a diode 50 through a lead 52. The cathode of the diode 50 is connected to the junction 25 which in turn is connected to the output lead 20. The second reactance circuit 46 includes a diode 58 having a cathode connected to the lead 16 and an anode connected to one plate of a capacitor 60 through a lead 62. The other plate of the capacitor 60 is connected to the junction point 25. The diodes 50 and 58 are also of the type which have nonlinear capacitance characteristics. It is to be noted that all of the leads of FIGS. 1 and 2 may be waveguides when operating at microwave frequencies, with the energy transferred in and out of the variable reactance circuits 18 and 28 by probes (not shown), for example.

The diodes 24, 32, 50 and 58 are semiconductor diodes whose capacitance is varied by a variation in voltage. As is well known, diodes of this type consist of a p zone having positive carriers corresponding to the anode end, an n zone having negative carriers corresponding to the cathode end, and a thin depletion zone in between the two other zones with relatively few free carriers therein. The p and n zones are shown in FIG. 1 for the diode 24. When a potential is applied to one of these diodes which is positive on the anode and negative on the cathode, the diode is forward biased and carriers act to bridge the depletion zone to form a conducting path through the diode. When the applied potential is reversed from the forward biased condition, the diode is back biased and the depletion zone reappears and insulates the two sides of the diode from each other. It is primarily in this back biased condition that the diode acts as a variable capacitance. A back bias across the diode causes the carriers to be pulled away from the depletion zone. The greater the potential applied in a back biased direction across the diode, the further the carriers are pulled away from the depletion zone and the lower is the capacitance of the diode. Also, the static characteristics of the diodes are such that they act as a capacitance for a very small voltage range in the forward bias condition. The diodes utilized in this invention, for example, may be "Varicap" silicon junction diodes manufactured by Pacific Semiconductors Inc., Culver City, California.

The operation of the circuits of this invention will now be explained by first referring to FIG. 1. The sine wave generator 10 develops a signal as shown by a waveform 66 which oscillates above and below a reference level which is shown as 0 volts. The signal of the waveform 66 which is at a fundamental frequency $f_1$ is continually passed to the variable reactance circuit 18. Each reactance element 21 and 29 develops a capacitance variation in response to the driving signal of the waveform 66 which is twice the frequency of the driving signal. A charge distribution and a bias between each capacitor and diode is developed in each reactance element 21 and 29 in response to the driving signal of the waveform 66. The capacitance variation develops current signals which are applied to the junction 25. The current signals are at harmonic frequencies of the driving signal of the waveform 66 with the even harmonics developed in each reactance element being 180 degrees out of phase from each other so as to cancel at the junction joint 25 and the odd harmonics being in phase with each other so as to add at the junction point 25.

When a positive alternation 68 is impressed on the reactance elements 21 and 29, the diode 32 is reverse biased with a large potential difference and develops a small capacitance. At the same time, the diode 24 is reverse biased with only a small potential difference and develops a large capacitance, the reverse bias condition resulting from the bias on the lead 26 as determined by the charge distribution between the capacitor 22 and the diode 24. Thus, as the alternation 68 rises in potential, the diode 24 has a relatively large increase of capacitance value and the diode 32 has a relatively small decrease of capacitance value. In response to the fall of potential of the alternation 68, the diode 24 has a relatively large decrease of capacitance value and the diode 32 has a relatively small increase of capacitance value. The overall capacitance thus varies by increasing and decreasing during the half period of the alternation 68.

When a negative alternation 70 is impressed on the reactance elements 21 and 29, the diode 24 is reverse biased with a large potential difference and develops a small capacitance. At the same time, the diode 32 is reverse biased with only a small potential difference and develops a large capacitance. The reverse bias condition of the diode 32 results from the bias on the lead 34 as determined by the charge distribution between the capacitor 28 and the diode 32. Thus, as the alternation 70 falls in potential, the diode 32 has a relatively large increase of capacitance value and the diode 24 has a relatively small decrease of capacitance value. As the alternation 70 rises in potential value, the diode 32 has a relatively large decrease in capacitance value and the diode 24 has a relatively small increase in capacitance value. The capacitance of the reactance circuit 28 thus varies by increasing and decreasing during the half period of the alternation 70. Therefore, the reactance elements 21 and 29 jointly develop a capacitance variation which is twice the frequency of the driving signal of the waveform 66.

Each reactance element 21 and 29 develops current components of all the odd and even harmonics of the frequency, $f_1$, of the driving signal. The even harmonics are 180 degrees out of phase from each other in the two reactance elements 21 and 29 and equal in amplitude, thus cancelling at the junction point 25. The odd harmonics are developed in phase in the two reactance elements and equal in amplitude and add at the junction point 25. Because there is nonlinear capacitance variation at twice the frequency $f_1$ of the drivng signal and it is modulated by the frequency $f_1$, with each reactance element developing the majority of the capacitance variation at alternate half cycles of the driving signal, the output current signals after cancelling at the junction 25 are seen to be only odd harmonic frequencies.

The circuit of FIG. 1 is now analyzed in the following discussion to show that only odd harmonic signals are applied to the lead 20. First, the capacitance $C_A$ developed by the single reactance element 29 is determined by a Fourier expansion of:

$$C_A=\frac{K}{\sqrt{\phi_0+V}}$$

where $\phi_0$=a measured constant which is the forward bias voltage required to overcome the junction potential of the diode 32.

$K$=a constant depending on the cross sectional area of the junction and the level of impurities in the semiconductor material.

$V$ (which is the voltage applied across a single diode is)$=A(1+\sin\omega t)$ where A is the peak amplitude, $\omega$ is the radian frequency and $t$ is time.

A Fourier expansion gives:

$$C_A=C_0+\sum_{N=1}^{\infty} a_{AN}\cos N\omega t+\sum_{N=1}^{\infty} b_{AN}\sin N\omega t$$

where $C_0$=Capacitance of the diode at the bias point $a_{AN}$ and $b_{AN}$ are Fourier coefficients By inspection:

$a_{AN}=0$ when $n$ is odd $b_{AN}=0$ when $n$ is even

When N is even $$a_{AN}=\frac{K}{\pi\sqrt{\phi_0+A}}\left\{\int_0^{\pi}\frac{\cos Nxdx}{1-\alpha\sin x}+\int_0^{\pi}\frac{\cos Nxdx}{1+\alpha\sin x}\right\}$$

and when N is odd $$b_{AN}=\frac{-K}{\pi\sqrt{\phi_0+A}}\left\{\int_0^{\pi}\frac{\sin Nxdx}{1-\alpha\sin x}-\int_0^{\pi}\frac{\sin Nxdx}{1+\alpha\sin x}\right\}$$

where $$\alpha=\frac{A}{\phi_0+A}$$

letting $\alpha_B=-\alpha_A$ to provide for the reverse arrangement of the reactance element 21, the capacitance $C_B$ across the reactance element 21 after a Fourier expansion may be expressed, as:

$$C_B=C_0+\sum_{M=1}^{\infty} a_{BN}\cos N\omega t+\sum_{M=1}^{\infty} b_{BN}\sin N\omega t$$

The total capacitance C developed by the reactance circuit 18 may be expressed as:

$$C=C_A+C_B$$

For the parallel combination of the reactance circuit 18, the above expressions for $C_A$ and $C_B$ are added to give:

$$a_{AN}+a_{BN}=\frac{K}{\pi\sqrt{\phi_0+A}}\left\{\left[\int_0^{\pi}\frac{\cos Nxdx}{\sqrt{1-\alpha\sin x}}+\int_0^{\pi}\frac{\cos Nxdx}{\sqrt{1+\alpha\sin x}}\right]+\left[\int_0^{\pi}\frac{\cos Nxdx}{\sqrt{1+\alpha\sin x}}+\int_0^{\pi}\frac{\cos Nxdx}{\sqrt{1-\alpha\sin x}}\right]\right\}=2a_{AN}$$

$$b_{AN}+b_{BN}=\frac{-K}{\pi\sqrt{\phi_0+A}}\left\{\left[\int_0^{\pi}\frac{\sin Nxdx}{\sqrt{1-\alpha\sin x}}-\int_0^{\pi}\frac{\sin Nxdx}{\sqrt{1+\alpha\sin x}}\right]+\left[\int_0^{\pi}\frac{\sin Nxdx}{\sqrt{1+\alpha\sin x}}-\int_0^{\pi}\frac{\sin Nxdx}{\sqrt{1-\alpha\sin x}}\right]\right\}=0$$

Therefore there are only $a_{AN}$ terms present and only even capacitance terms. The total capacitance C at the junction 25 may thus be expressed as:

$$C=2C_0+2\sum_{\substack{N\text{ even}\\2,4,6\ldots}}^{\infty}a_N\cos N\omega t$$

To find the charge Q developed by the reactance circuit 18, the capacitors 22 and 28 will be assumed to be relatively large and the capacitance value thereof will not be considered.

$$Q=CV=2C_0A\sin\omega t+A\sum_{N=2,4,6\ldots}^{\infty}a_N\left[\sin(N+1)\omega t-\sin(N-1)\omega t\right]$$

Differentiating the charge Q, the expression for the current components is:

$$i=2C_0A\omega\cos\omega t+\omega A\sum_{N=1}^{\infty}a_{2N}\left[(2N+1)\cos(2N+1)\omega t-(2N-1)\cos(2N-1)\omega t\right]$$

By inspection, it may be seen that all current components at the junction 25 are (2N±1) multiples of $\omega$ and are odd harmonics. Thus, the even harmonics are cancelled within the reactance circuit 18 and only odd harmonic current components are applied to the lead 20. The reactance circuit 28 of FIG. 2 may be analyzed in a similar manner to show the even harmonics are also cancelled in that circuit.

Referring now also to FIG. 2, the operation of the reactance circuit 28 will be further described. The reactance elements 44 and 46 develop a capacitance variation in a similar manner to the respective elements 21 and 29 of the reactance circuit 18 in response to the driving signal of the waveform 66. A similar bias condition is developed on the leads 52 and 62 because of the current distribution between the capacitor 48 and the diode 50 and between the capacitor 60 and the diode 58. Also the reactance elements 44 and 46 develop even harmonic current signals which are 180 degrees out of phase from each other and develop odd harmonic current signals which are in phase with each other. The even harmonic signals cancel and the odd harmonic current signals add at the junction point 25 similar to the reactance circuit 18. Therefore, the odd harmonic generator of the invention may utilize either of the reactance circuits 18 or 28.

The current components on the lead 20 are thus odd harmonics of the driving signal of the waveform 66 which is shown at a frequency of $f_1$. The tank circuit 31, when the multiplier acts as a frequency tripler for example, is tuned to store energy at the desired third harmonic frequency which is shown as a frequency of $3f_1$, thus presenting a high impedance to the current components at this frequency. Therefore, an output voltage signal as shown by a waveform 74 is developed on the output lead 20. All other signals are passed to ground potential through the low impedance of the tank circuit 31 at frequencies other than $3f_1$ to be effectively short circuited. It is to be again noted that the tank circuit 31 may be tuned to any desired odd harmonic frequency to develop output voltage signals on the lead 20 at that frequency.

Because the even harmonics are cancelled at the junction point 25, the tank circuit 31 may be designed with a relatively wide impedance band. For satisfactory operation at a relatively high frequency of the driving signals of the waveform 66, it has been found difficult to design tank circuits with a sufficiently narrow band to only present a high impedance to current signals of the selected odd harmonic frequency with even harmonic current signals present. Thus, the odd harmonic generator of this invention may be utilized with a simplified tank circuit which has a minimum of components.

The diode of each reactance circuit which is increasing in capacitance, as discussed above, in response to the driving signal of the waveform 66, may be biased into conduction at the maximum and minimum peaks of the driving signal. When the diode is biased into conduction, the current is conducted therethrough to overcome effects of small variations in the amplitude of the driving signal of the waveform 66.

The reactance circuits 18 and 28 of this invention allow the use of circuits to form fixed bias voltages across the diodes. These bias voltages across the diodes allow the use of diodes that are not perfectly matched in capacitance characteristics while still cancelling the even harmonics. Also, bias circuits may be required when a number of harmonic generators are connected in series so as to cause the circuits to initially start operation with desired operating potentials. Also, any effects of variations in amplitude of the driving signal are minimized by fixed biases plus self bias across the diodes. The frequency multiplier of this invention has been operated satisfactorily over a frequency range of the signal of the waveform 66 from the generator 10 between 5 to 15 megacycles. The circuit also operates at much higher frequencies and is not limited to the above frequency ranges.

Thus, there has been described a simplified and highly efficient parametric frequency multiplier. The circuit forms the third harmonic of the driving signal or any desired odd harmonic as determined by the frequency at which the tank circuit is tuned. Because of the parallel arrangement of the reactance elements, the even harmonic current signals developed thereby are cancelled, allowing a simplified tank circuit with a relatively wide band to be utilized. This circuit has the advantage that the capacitors are connected in parallel allowing a high capacitance to be obtained with capacitors having smaller capacitance values. Also, this circuit has an advantage over other circuits because at low frequencies a larger capacitance may be required than is obtainable from single diodes. This circuit operates with high efficiency at a high frequency to provide a simplified means to increase the frequency at which radar transmission may be performed.

What is claimed is:

1. A frequency multiplier comprising: an alternating signal generator to develop a driving signal at a fundamental frequency; variable reactance means for developing a reactance variation at twice said fundamental frequency in response to said driving signal; said variable reactance means including a first reactance having a non-linear reactance vs. voltage characteristic, a second reactance having a non-linear reactance vs. voltage characteristic connected in parallel with said first reactance in a manner to provide a reactance vs. voltage characteristic symmetrically opposite that of said first reactance with respect to applied voltage, and means for maintaining both said first and second reactances non-conductive of D.C. current during the entire cycle of said driving signal, whereby signals of odd harmonics only of said fundamental frequency are produced; and a tank circuit coupled to said variable reactance means and tuned to a selected odd harmonic frequency of said fundamental frequency.

2. A harmonic generator circuit comprising: a source of driving signals at a fundamental frequency; variable reactance means for developing a reactance variation at twice said fundamental frequency and having a first end coupled to said source and a second end at which signals of odd harmonics only of said fundamental frequency are produced; said variable reactance means being non-conductive of D.C. current during the entire driving signal cycle and comprising first and second A.C. paths between said first end and said second end, said first path including a first reactance having a non-linear reactance vs. voltage characteristic, said second path including a second reactance having a non-linear reactance vs. voltage characteristic symmetrically opposite that of said first reactance with respect to applied voltage; and a resonant circuit coupled to said second end of said variable reactance means and tuned to a selected odd harmonic frequency of said fundamental frequency.

3. A harmonic generator circuit comprising: a source of driving signals at a fundamental frequency; a tank circuit resonant at a selected odd harmonic frequency of said fundamental frequency having one end coupled to one end of said source; and a reactance circuit for developing a reactance variation at twice said fundamental frequency coupled between the other end of said source and the other end of said tank circuit, whereby signals of odd harmonics only of said fundamental frequency are produced at said other end of said tank circuit, said reactance circuit consisting solely of the parallel combination of a series first variable reactance having a non-linear reactance vs. voltage characteristic and a first fixed reactance with a series second variable reactance having a non-linear reactance vs. voltage characteristic symmetrically opposite that of said first variable reactance with respect to applied voltage and a second fixed reactance.

4. A frequency multiplier comprising: an alternating signal generator to develop a driving signal at a fundamental frequency; variable capacitance means for developing a capacitance variation at twice said fundamental frequency in response to said driving signal; said variable capacitance means including a first semiconductor diode having a non-linear capacitance vs. voltage characteristic, a second semiconductor diode having a like non-linear capacitance vs. voltage characteristic connected in parallel with and in opposite polarity to said first semiconductor diode, and means for maintaining both said first and said second semiconductor diodes reverse biased during the entire cycle of said driving signal, whereby signals of odd harmonics only of said fundamental frequency are produced; and a tank circuit coupled to said variable capacitance means and tuned to a selected odd harmonic frequency of said fundamental frequency.

5. A frequency multiplier comprising: an alternating signal generator to develop a driving signal at a fundamental frequency; variable capacitance means for developing a capacitance variation at twice said fundamental frequency and having a first end point coupled to said source and a second end point at which signals of odd harmonics only of said fundamental frequency are produced; said variable capacitance means being non-conductive of D.C. current during the entire cycle of said driving signal and comprising first and second parallel A.C. paths between said first end point and said second end point, said first path consisting of a first fixed capacitance and a first semiconductor diode having a non-linear capacitance vs. voltage characteristic connected in a series, with the cathode of said first diode being connected to said second end point, said second path consisting of a second fixed capacitance and a second semiconductor diode having a non-linear capacitance vs. voltage characteristic connected in a series, with the anode of said second diode connected to said second end point; and a tank circuit connected to said second end point of said variable capacitance means and tuned to a selected odd harmonic frequency of said fundamental frequency.

6. A frequency multiplier comprising: an alternating signal generator to develop a driving signal at a fundamental frequency; variable capacitance means for developing a capacitance variation at twice said fundamental frequency and having a first end point coupled to said source and a second end point at which signals of odd harmonics only of said fundamental frequency are produced; said variable capacitance means being non-conductive of D.C. current during the entire cycle of said driving signal and comprising first and second parallel paths between said first end point and said second end point, said first path consisting of a first fixed capacitance and a first semiconductor diode having a non-linear capacitance vs. voltage characteristic connected in series, with the cathode of said first diode being connected to said second end point, said second path consisting of a second fixed capacitance and a second semiconductor diode having a non-linear capacitance vs. voltage characteristic connected in series, with the cathode of said second diode connected to said first end point; and a tank circuit connected to said second end point of said variable capacitance means and tuned to a selected odd harmonic frequency of said fundamental frequency.

References Cited in the file of this patent

UNITED STATES PATENTS

| | | |
|---|---|---|
| 1,890,527 | Osnos | Dec. 13, 1932 |
| 2,122,748 | Mayer | July 5, 1938 |
| 2,190,731 | Posthumus | Feb. 20, 1940 |
| 2,243,921 | Rust | June 3, 1941 |
| 2,440,465 | Ferguson | Apr. 27, 1948 |
| 2,946,963 | Lee | July 26, 1960 |

OTHER REFERENCES

"Effect of Field Strength on Dielectric Properties of Barium Strontium Titanate," RCA Review, vol. VIII, No. 3, September 1947, pages 539–553.

"Gain, Band Width and Noise Characteristics of the Variable Parameter Amplifier," by Heffner and Wade; Journal of Applied Physics, vol. 29, No. 9, September 1958, pages 1321–1331.